US012749476B2

(12) United States Patent
Shepherd et al.

(10) Patent No.: US 12,749,476 B2
(45) Date of Patent: Sep. 29, 2026

(54) SENTIMENT-BASED ADAPTATION OF DIGITAL HUMAN RESPONSES

(71) Applicant: Dell Products L.P., Round Rock, TX (US)

(72) Inventors: Michael David Shepherd, Leander, TX (US); Jonathan M. Whitson, Mountain Grove, MO (US)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 18/653,017

(22) Filed: May 2, 2024

(65) Prior Publication Data

US 2025/0342819 A1 Nov. 6, 2025

(51) Int. Cl.

| | |
|---|---|
| ***G10L 25/63*** | (2013.01) |
| ***G06F 40/30*** | (2020.01) |
| ***G06N 20/00*** | (2019.01) |
| ***G06V 40/16*** | (2022.01) |
| ***G10L 13/08*** | (2013.01) |
| ***G10L 15/18*** | (2013.01) |
| ***G10L 15/22*** | (2006.01) |

(52) U.S. Cl.

CPC ............ *G10L 13/08* (2013.01); *G06V 40/174* (2022.01); *G10L 15/1807* (2013.01); *G10L 15/22* (2013.01); *G10L 2015/223* (2013.01); *G10L 2015/227* (2013.01)

(58) Field of Classification Search

CPC .......... G10L 15/16; G10L 15/22; G10L 25/63

See application file for complete search history.

(56) References Cited

U.S. PATENT DOCUMENTS

2018/0373547 A1* 12/2018 Dawes ............... H04N 21/4788
2019/0266999 A1* 8/2019 Chandrasekaran ..... G06F 3/167

(Continued)

OTHER PUBLICATIONS https://rasa.com/solutions/bots-digital-assistants/; downloaded Apr. 30, 2024.

(Continued)

*Primary Examiner* — Jialong He

(74) *Attorney, Agent, or Firm* — Ryan, Mason & Lewis, LLP

(57) ABSTRACT

Techniques are provided for sentiment-based adaptation of digital human responses. One method comprises determining a sentiment of a user by analyzing a vocal sentiment, a text sentiment and/or a facial sentiment of the user; applying the determined sentiment of the user to a language model that determines a sentiment-tagged response to an input of the user based on the determined sentiment, wherein the sentiment-tagged response comprises a predicted sentiment label identifying a sentiment to be employed by a digital human when delivering the sentiment-tagged response to the user; and providing the sentiment-tagged response to the digital human for delivery to the user, wherein the digital human transforms at least a portion of the sentiment-tagged response into a spoken format using the predicted sentiment label and a text-to-speech model. A vocal tone, a facial expression and/or a body positioning of the digital human may be adjusted based on the determined sentiment.

20 Claims, 8 Drawing Sheets

(56) References Cited

U.S. PATENT DOCUMENTS

| | | | | |
|---|---|---|---|---|
| 2023/0259711 | A1* | 8/2023 | Goto | G06F 40/289<br>704/9 |
| 2024/0169974 | A1* | 5/2024 | Bonar | G10L 15/26 |
| 2024/0282298 | A1* | 8/2024 | Koneru | G10L 15/183 |

OTHER PUBLICATIONS

Abhinav Veeramalla, "Face Detection and Cropping using OpenCV in Python," (Medium, Jul. 12, 2023).
"CoreNLP: A Java Suite of Core NLP Tools for Tokenization, Sentence Segmentation, NER, Parsing, Coreference, Sentiment Analysis, etc."; https://github.com/stanfordnlp/CoreNLP; downloaded Apr. 30, 2024.
Bagus Tris Atmaja and Akira Sasou, "Sentiment Analysis and Emotion Recognition from Speech Using Universal Speech Representations," National Institute of Advanced Industrial Science and Technology, Tsukuba 305-8560, Japan, Sensors 2022, Aug. 24, 2022.
Saining Zhang et al., "A Dual-Direction Attention Mixed Feature Network for Facial Expression Recognitions," Electronics 2023, Aug. 25, 2023.

* cited by examiner

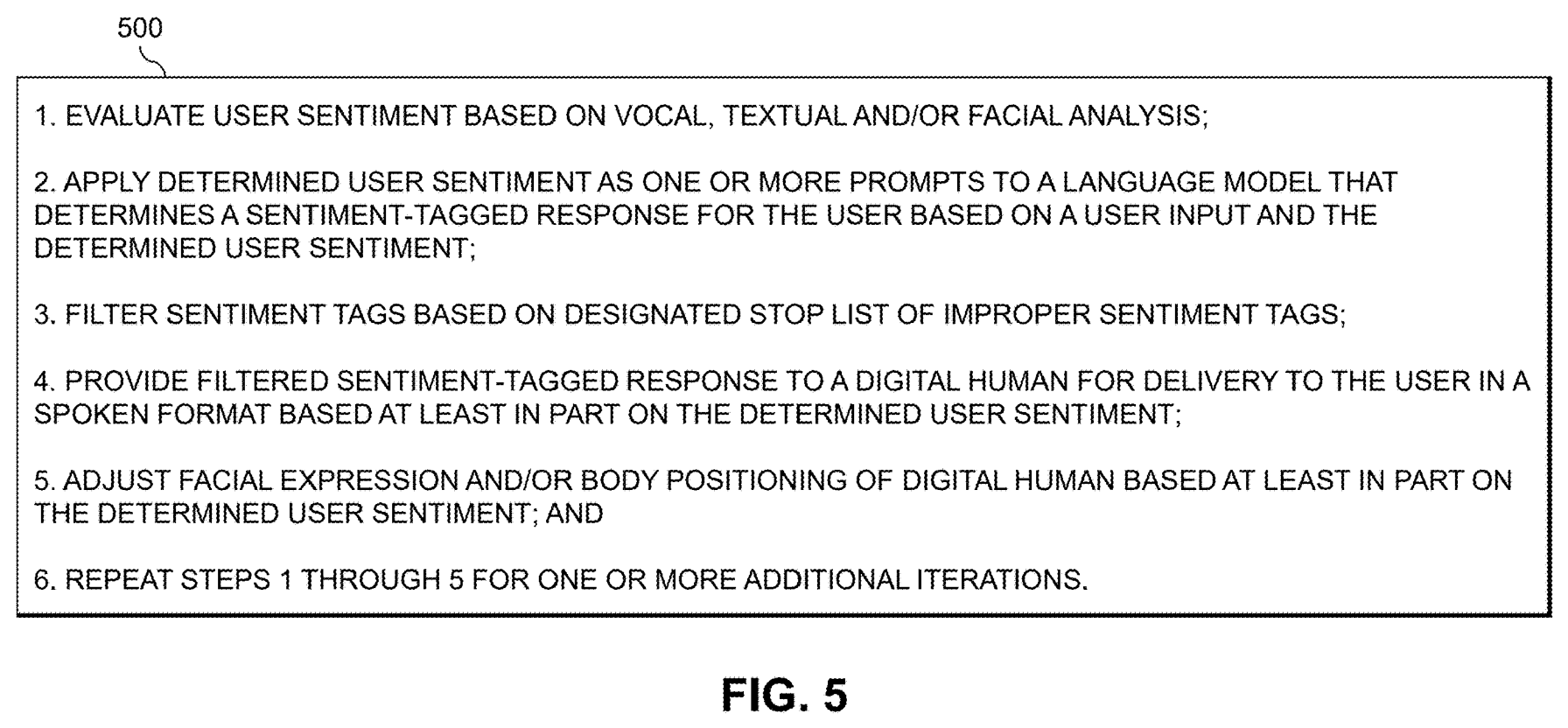

500

1. EVALUATE USER SENTIMENT BASED ON VOCAL, TEXTUAL AND/OR FACIAL ANALYSIS;

2. APPLY DETERMINED USER SENTIMENT AS ONE OR MORE PROMPTS TO A LANGUAGE MODEL THAT DETERMINES A SENTIMENT-TAGGED RESPONSE FOR THE USER BASED ON A USER INPUT AND THE DETERMINED USER SENTIMENT;

3. FILTER SENTIMENT TAGS BASED ON DESIGNATED STOP LIST OF IMPROPER SENTIMENT TAGS;

4. PROVIDE FILTERED SENTIMENT-TAGGED RESPONSE TO A DIGITAL HUMAN FOR DELIVERY TO THE USER IN A SPOKEN FORMAT BASED AT LEAST IN PART ON THE DETERMINED USER SENTIMENT;

5. ADJUST FACIAL EXPRESSION AND/OR BODY POSITIONING OF DIGITAL HUMAN BASED AT LEAST IN PART ON THE DETERMINED USER SENTIMENT; AND

6. REPEAT STEPS 1 THROUGH 5 FOR ONE OR MORE ADDITIONAL ITERATIONS.

FIG. 5

SENTIMENT-BASED ADAPTATION OF DIGITAL HUMAN RESPONSES

BACKGROUND

A digital human is a computer-generated representation of a person that aims, for example, to behave like a real person. Users increasingly engage with digital humans in various environments, such as retail environments, training environments and customer support environments, and for various purposes. There are a number of challenges, however, that need to be addressed in order for such digital humans to successfully interact like a real person.

SUMMARY

Illustrative embodiments of the disclosure provide techniques for sentiment-based adaptation of digital human responses. One method includes determining a sentiment of at least one user by performing one or more signal processing operations on one or more information streams characterizing one or more of a vocal sentiment, a text sentiment and a facial sentiment of the at least one user; applying the determined sentiment of the at least one user to at least one language model that determines at least one sentiment-tagged response to an input of the at least one user based at least in part on the determined sentiment of the at least one user, wherein the at least one sentiment-tagged response comprises at least one predicted sentiment label identifying at least one sentiment to be employed by at least one processor-based digital human when delivering the at least one sentiment-tagged response to the at least one user; and providing the sentiment-tagged response to the at least one processor-based digital human for delivery to the at least one user, wherein the at least one processor-based digital human transforms at least a portion of the sentiment-tagged response into a spoken format using the at least one predicted sentiment label and at least one text-to-speech model.

Illustrative embodiments can provide significant advantages relative to conventional techniques. For example, technical problems related to such conventional techniques are mitigated in one or more embodiments by adapting digital human responses based on a determined user sentiment.

These and other illustrative embodiments described herein include, without limitation, methods, apparatus, systems, and computer program products comprising processor-readable storage media.

BRIEF DESCRIPTION OF THE DRAWINGS

FIG. 5 is a process diagram illustrating an exemplary process for sentiment-based adaptation of digital human responses in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for sentiment-based adaptation of digital human responses.

In one or more embodiments, techniques are provided for sentiment-based adaptation of digital human responses. Sensing data (such as audio and/or video sensor data) related to one or more remote users can be applied to the disclosed digital human adaptation system (comprising, for example, one or more analytics algorithms, such as machine learning (ML) algorithms, artificial intelligence (AI) techniques, computer vision (CV) algorithms and/or data analytics algorithms) to obtain real-time responses for each remote user.

In at least some embodiments, the disclosed digital human adaptation techniques provide a number of technical solutions. For example, a sentiment of a particular user can be determined by applying sensing data (such as audio and/or video sensor data) related to the particular user to an analytics engine, and a sentiment-based response can be automatically provided to a language model to improve an effectiveness of the digital human experience, for example.

In one or more embodiments, the disclosed techniques for sentiment-based adaptation of digital human responses employ computer vision techniques to collect and evaluate real-time user behavior information, such as facial expression. The collected data can be processed to obtain a sentiment of one or more users and to initiate an automatic generation of a language model prompt to obtain a response to be delivered by a digital human based on the user sentiment.

At least some aspects of the disclosure recognize that users may be less engaged with a digital human than with a real person because physical interactions with the digital human may be reduced or non-existent, which may decrease the rich communication and other dynamics that encourage users to consistently participate in a dialogue. In an in-person physical environment, for example, participants can more easily identify visual cues of a user by evaluating the body language and/or facial expression of participants to obtain an immediate assessment of each participant's interests. In a remote digital human environment, however, it is difficult for participants to evaluate and assess the interests of other participants remotely.

Figure 1:
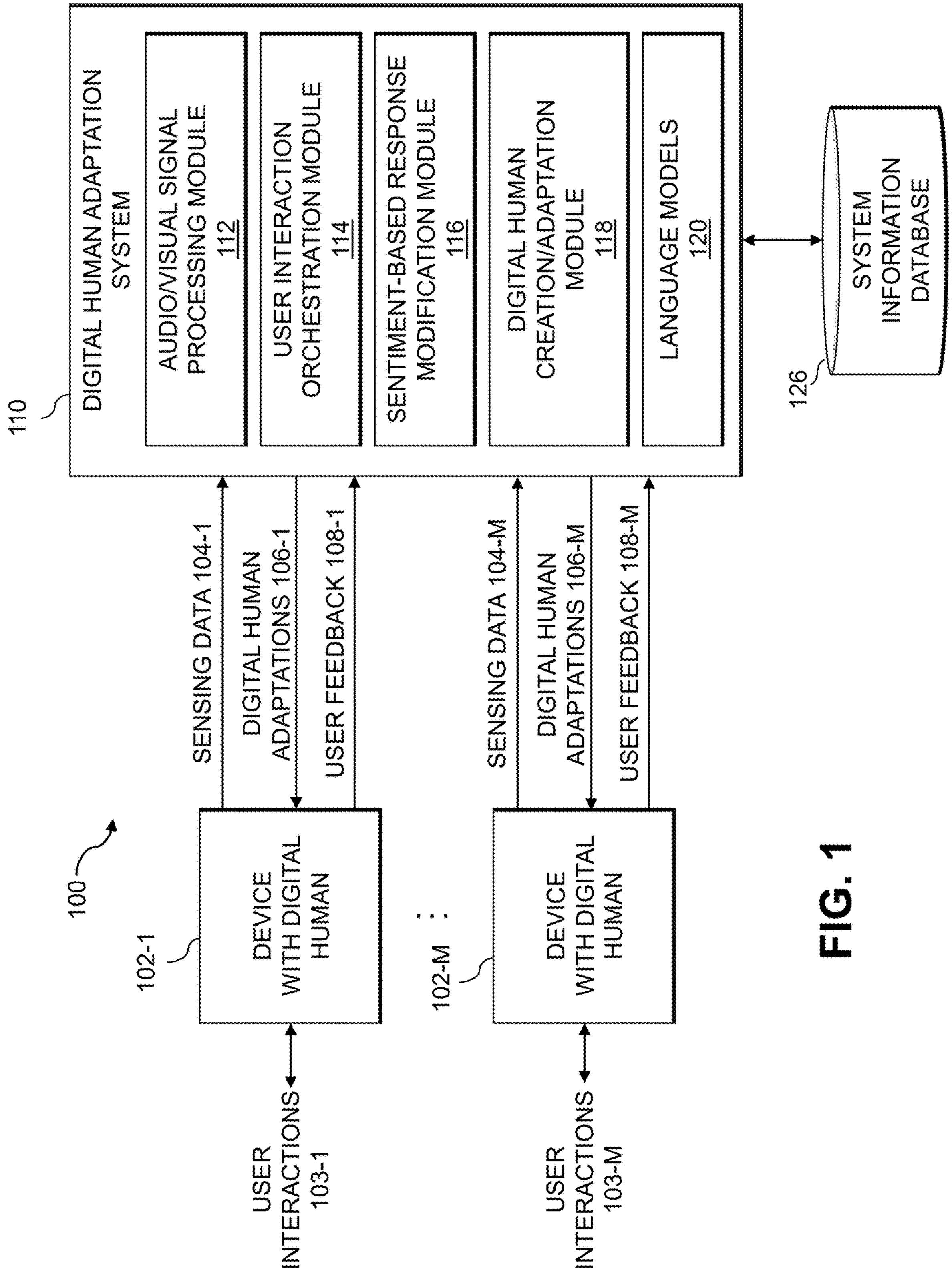
FIG. 1 illustrates an information processing system configured for sentiment-based adaptation of digital human responses in accordance with an illustrative embodiment.

FIG. 1 shows an information processing system 100 configured in accordance with an illustrative embodiment. The information processing system 100 comprises a plurality of devices with a digital human 102-1 through 102-M, collectively referred to herein as digital human devices 102. The digital human devices 102-1 through 102-M interact with one or more respective users to generate respective user interactions 103-1 through 103-M. Generally, artificial intelligence-based chat robots (e.g., chatbots) or other digital humans typically use one or more machine learning models to understand a context and an intent of a question asked by a user before providing an answer. The digital human devices 102 may be implemented, for example, as a user device presenting a digital human, a kiosk presenting a digital human, and/or a device that presents a digital human using a holograph and/or a three-dimensional or lenticular display. The information processing system 100 further comprises one or more digital human adaptation systems 110 and a system information database 126, discussed below.

The digital human devices 102 may comprise, for example, host devices and/or devices such as mobile telephones, laptop computers, tablet computers, desktop computers, kiosks, holographic devices, three-dimensional displays or other types of computing devices (e.g., virtual reality (VR) devices or augmented reality (AR) devices). Such devices are examples of what are more generally referred to herein as "processing devices." Some of these processing devices are also generally referred to herein as "computers." The digital human devices 102 may comprise a network client that includes networking capabilities such as ethernet, Wi-Fi, etc. The digital human devices 102 may be implemented, for example, by participants of a customer support interaction, such as one or more users or customers and one or more virtual customer support representatives.

One or more of the digital human devices 102 and the digital human adaptation system 110 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

The digital human devices 102 and/or the digital human adaptation system 110 in some embodiments comprise respective devices and/or servers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, such as avatar or other computer-generated representations of a human, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of edge devices, or a stand-alone computing and storage system implemented within a given enterprise.

One or more of the digital human devices 102 and the digital human adaptation system 110 illustratively comprise processing devices of one or more processing platforms. For example, the digital human adaptation system 110 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the digital human devices 102 and the digital human adaptation system 110 can additionally or alternatively be part of cloud infrastructure or another cloud-based system.

In the example of FIG. 1, each digital human device 102-1 through 102-M provides corresponding sensing data 104-1 through 104-M, collectively referred to herein as sensing data 104, associated with the respective user to the digital human adaptation system 110. For example, the sensing data 104 may be generated by cameras, microphones, IoT sensors or other sensors near the respective users that can be used for data collection, including audio signals, video signals, physiological data, motion and emotion data. The sensors may be embedded within existing digital human devices 102, such as graspable and touchable user devices (e.g., computer, monitor, mouse, keyboards, smart phone and/or AR/VR headsets). The sensors may also be implemented as part of laptop computer devices, smart mobile devices or wearable devices on the body of a user, such as cameras, microphones, physiological sensors and smart watches.

In addition, each digital human device 102-1 through 102-M can receive digital human adaptations 106-1 through 106-M, collectively referred to herein as digital human adaptations 106, from the digital human adaptation system 110. The digital human adaptations 106 can be initiated, for example, to present and/or adjust a digital human on the respective digital human device 102, or to provide specific information to a respective user (e.g., requested information and/or topic summaries) and/or to stimulate the respective user if the respective user is detected to have a different sentiment or level of engagement than expected.

Further, each digital human device 102 can provide user feedback 108-1 through 108-M, collectively referred to herein as user feedback 108, to the digital human adaptation system 110 indicating, for example, an accuracy of information provided by the digital human on the digital human device 102 to a respective user (e.g., to fine tune an analytics engine or another model associated with the digital human adaptation system 110), special circumstances associated with the respective user and/or feedback regarding particular recommendations or suggestions made by the digital human adaptation system 110 in the form of digital human adaptations 106.

In some embodiments, users can receive or request information from the digital human on the digital human device 102, and provide the user feedback 108 back to the digital human adaptation system 110 indicating whether the digital human response or recommendations are accurate, thereby providing a closed loop learning system. The user feedback 108 indicating the accuracy of the digital human response or recommendations can be used to train and/or retrain one or more models employed by the digital human adaptation system 110.

In some embodiments, each digital human device 102 can receive additional feedback from the digital human adaptation system 110 based at least in part on the user interactions 103 of the respective user with the digital human. For example, the digital human adaptations 106 for a given user may comprise a text signal (e.g., to be transformed into a voice signal by the digital human), a voice message, graphical information and/or manipulations of the position, emotion and/or rotation of the digital human, or a combination of the foregoing, to provide targeted information, an alert and/or instructions to the given user during a digital human session.

The digital human adaptations 106 can be automatically generated, for example, if users are detected to have a negative sentiment or to be distracted (e.g., when the measured engagement level falls below a threshold or deviates from another criteria). For example, a voice message can ask if a user needs assistance during a digital human session, when the user fails to speak within a designated time period, or when the user is stressed or uninterested, for example. The digital human adaptations 106 could be specifically designed based on different scenarios.

As shown in FIG. 1, the exemplary digital human adaptation system 110 comprises an audio/visual signal processing module 112, a user interaction orchestration module 114, a sentiment-based response modification module 116, a digital human creation/adaptation module 118 and at least one language model 120, as discussed further below.

In one or more embodiments, the audio/visual signal processing module 112 may be used to collect and/or process audio/visual data and other sensing data 104 and to optionally perform one or more (i) sensor data pre-processing tasks, (ii) audio/visual analysis tasks and/or (iii) audio/visual tracking tasks, for example. The user interaction orchestration module 114 coordinates the user interactions 103 between the digital human devices 102 and the respective users with one or more backend portions of the digital human adaptation system 110, for example. The exemplary sentiment-based response modification module 116 evaluates the audio/visual data and/or other sensor data to determine a sentiment of a particular user and a sentiment-based digital human response. The user sentiment determined by the sentiment-based response modification module 116 may be used to generate one or more user sentiment-based prompts that are applied to at least one language model 120, such as a large language model or another model that can generate text and perform natural language processing (NLP) tasks, that determines a sentiment-based response for a user of a respective digital human device 102, as discussed further below in conjunction with FIGS. 2 through 4, for example. The at least one language model 120 may learn statistical relationships from a training dataset comprised of text documents using a self-supervised training process and/or a semi-supervised training process. The at least one language model 120, in some embodiments, may combine a partial response based on results from a user query and/or a partial response of the at least one language model 120 based on its own information into a final response.

The term "language model" as used herein is intended to be broadly construed so as to encompass, for example, natural language processing models trained on textual data to understand, generate, predict and/or summarize new content. The at least one language model 120 may be implemented, for example, using transformer-based architectures that process input through a sequence of transformers, where each transformer includes a self-attention layer and feedforward layer. Generally, a self-attention layer computes an importance of each token in a sequence of input tokens, and a feedforward layer transforms the output of the self-attention layer into a form that is suitable for the next transformer in the sequence.

The digital human creation/adaptation module 118 generates a given digital human presented on a respective digital human device 102 and/or one or more digital human adaptations 106 to one or more of the digital human devices 102, as discussed further below. The digital human creation/adaptation module 118 may be implemented, at least in part, using an Unreal Engine three-dimensional computer graphics tool, commercially available from Epic Games, Inc., as modified herein to provide the features and functions of the present disclosure.

It is to be appreciated that this particular arrangement of elements 112, 114, 116, 118, 120 illustrated in the digital human adaptation system 110 of the FIG. 1 embodiment is presented by way of example only, and alternative arrangements can be used in other embodiments. For example, the functionality associated with elements 112, 114, 116, 118, 120 in other embodiments can be combined into a single elements, or separated across a larger number of elements. As another example, multiple distinct processors and/or memory elements can be used to implement different ones of elements 112, 114, 116, 118, 120 or portions thereof. At least portions of elements 112, 114, 116, 118, 120 may be implemented at least in part in the form of software that is stored in memory and executed by a processor.

The digital human adaptation system 110 may further include one or more additional modules and other components typically found in conventional implementations of such devices, although such additional modules and other components are omitted from the figure for clarity and simplicity of illustration.

In the FIG. 1 embodiment, the digital human adaptation system 110 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the digital human adaptation system 110 to reside in different data centers. Numerous other distributed implementations of the components of the system 100 are possible.

As noted above, the digital human adaptation system 110 can have an associated system information database 126 configured to store information related to one or more of the digital human devices 102, such as sensing, AR and/or VR capabilities, user preference information, static digital human topologies and a digital human datastore. Although the system information is stored in the example of FIG. 1 in a single system information database 126, in other embodiments, an additional or alternative instance of the system information database 126, or portions thereof, may be incorporated into the digital human adaptation system 110 or other portions of the system 100.

The system information database 126 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the digital human devices 102 and the digital human adaptation system 110 can be one or more input/output devices (not shown), which illustratively comprise keyboards, displays or other types of input/output devices in any combination. Such input/output devices can be used, for example, to support one or more user interfaces to a digital human device 102, as well as to support communication between the digital human adaptation system 110 and/or other related systems and devices not explicitly shown in FIG. 1.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for digital human adaptation is presented by way of illustrative example only, and in other embodiments additional or alternative elements may be used. Thus, another embodiment includes additional or alternative systems, devices and other network entities, as well as different arrangements of modules and other components.

One or more aspects of the disclosure recognize that existing digital humans lack an ability to predict questions of a user simply through observation. While humans can notice where a person is looking and ask them a question about the item they are looking at, a digital human needs an awareness of where the person is looking and what aspects of a display screen, for example, are being looked at.

Figure 2:
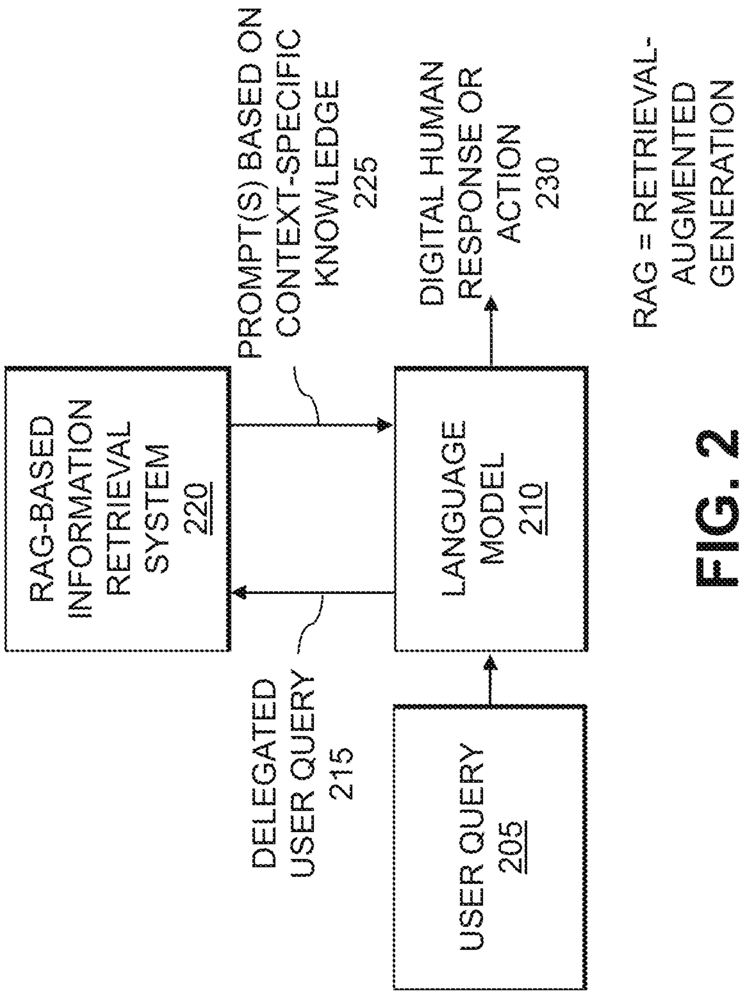
FIG. 2 illustrates a generation of a response for a digital human based at least in part on a user query-based prompt applied to a language model in accordance with an illustrative embodiment.

FIG. 2 illustrates a generation of a response for a digital human based at least in part on a user query-based prompt applied to a language model in accordance with an illustrative embodiment. In the example of FIG. 2, a user query 205 is applied to a language model 210. The user query 205 may be an explicit question asked by a user (e.g., as part of a conversational dialogue) and/or an implied question inferred from behavior of the user, such as a predicted region of interest to the user based at least in part on what the user is looking at (e.g., which may suggest what a person is thinking about and may be used to initiate and/or continue a dialogue with the user). In this manner, one or more embodiments of the present disclosure provide for intelligent prompt injection to the language model 210 using a retrieval-augmented generation (RAG)-based information retrieval system 220 to benefit the conversational flow.

The language model 210 (or another backend element of the digital human adaptation system 110) may delegate the user query 205, in some embodiments, as a delegated user query 215 to the RAG-based information retrieval system 220. The RAG-based information retrieval system 220 receives the delegated user query 215 as an input and performs one or more information retrieval operations. The response from the RAG-based information retrieval system 220 may be in the form of ranked results in some embodiments, and the top N results (e.g., the highest-ranking result) may be applied to the language model 210 as one or more prompts (e.g., based at least in part on a prompt size limit).

The RAG-based information retrieval system 220 generates one or more prompts 225 based on context-specific knowledge obtained using the delegated user query 215. RAG is a technique for enhancing the accuracy and/or reliability of generative artificial intelligence models, such as the language model 210, with information obtained from external sources. The prompts 225 ground the language model 210 in some embodiments using one or more external sources of knowledge that supplement the internal representation of information by the language model 210. The RAG-based information retrieval system 220 may be implemented, at least in part, in some embodiments, using the Pryon answer engine, commercially available from Pryon Inc. and/or the information retrieval functionality of the Milvus open-source vector database system.

The one or more prompts 225 are applied to the language model 210 that generates a digital human response or action 230 (e.g., relevant information and responses based on a conversational dialogue and/or the user's region of interest). The language model 210 may combine the retrieved words in the one or more prompts 225 with its own response to the user query 205 into a final digital human response or action 230. The digital human response or action 230 may be communicated to the user, for example, using the digital human creation/adaptation module 118, as discussed herein. The digital human response or action 230 may comprise relevant information and responses based on a conversational dialogue and/or what the user was looking at.

For additional discussions of digital human adaptation techniques, see, for example, U.S. patent application Ser. No. 18/652,936 entitled "Gesture-Based Processing of Digital Human Responses," U.S. Pat. No. 12,326,968 entitled "Orienting Digital Humans Towards Isolated Speaker," U.S. patent application Ser. No. 18/652,961 entitled "Selecting Isolated Speaker Signal by Comparing Text Obtained from Audio and Video Streams," U.S. patent application Ser. No. 18/652,977 entitled "Phoneme-Based Pronunciations for Digital Humans," U.S. Pat. No. 12,517,580 entitled "Automatically Generating Language Model Prompts Using Predicted Regions of Interest," U.S. patent application Ser. No. 18/652,990 entitled "Pause-Based Text-To-Speech Processing for Digital Humans," U.S. patent application Ser. No. 18/652,926 entitled "Identity-Based Varied Digital Human Responses," U.S. patent application Ser. No. 18/653,028 entitled "Reinstantiating Digital Humans With Stored Session Context in Response to Device Transfer," U.S. Pat. No.

12,615,301 entitled "Reinstantiating Digital Humans With Stored Session Context in Response to Navigation to a Different Destination," and U.S. patent application Ser. No. 18/652,991 entitled "Personalizing Vehicles Using Digital Humans to Administer User Preferences," each filed contemporaneously herewith and incorporated by reference herein in its entirety.

Figure 3:
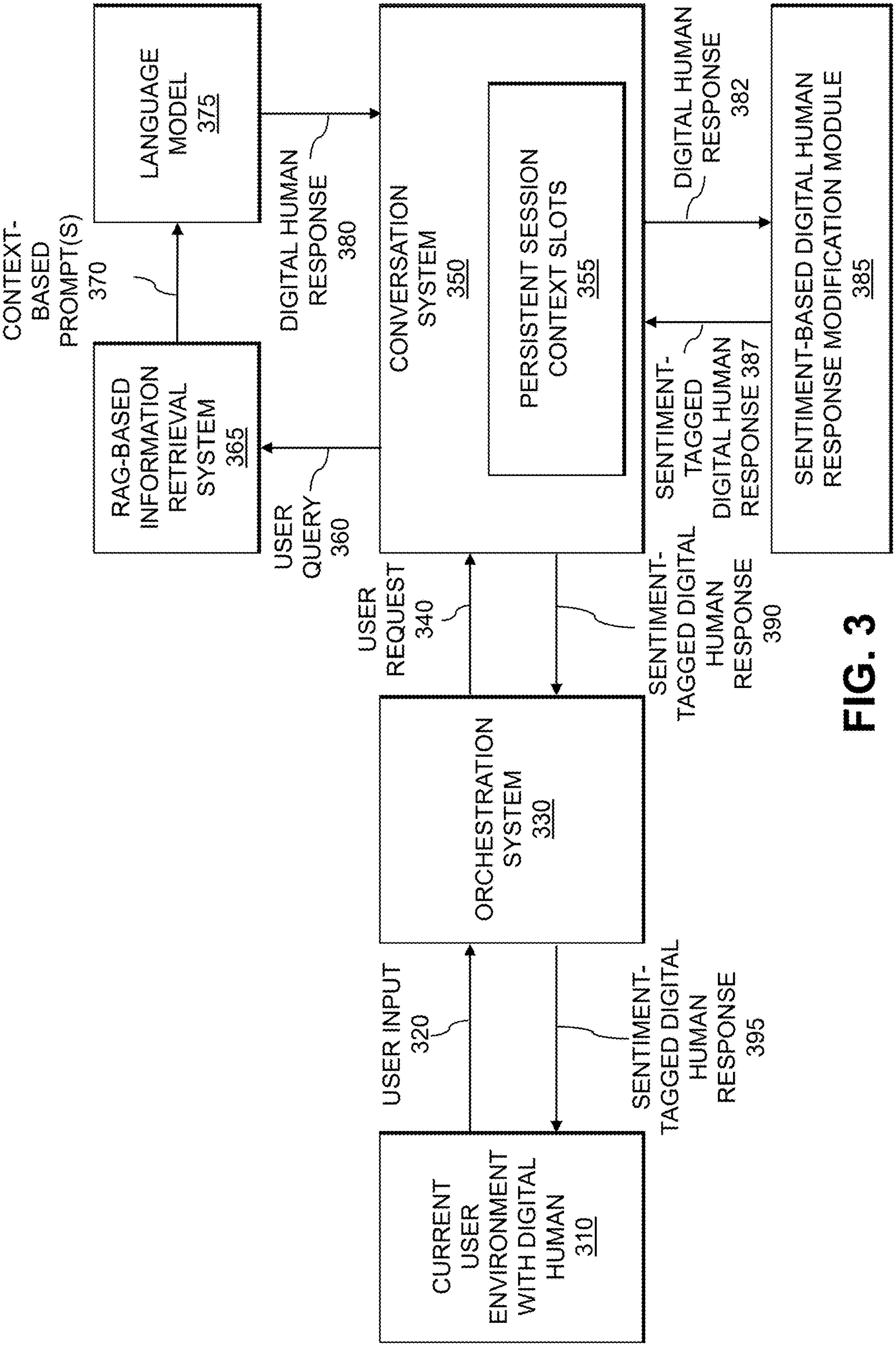
FIG. 3 illustrates a processing of a conversational dialogue between a user and a digital human using sentiment-based adaptation of digital human responses in accordance with an illustrative embodiment.

FIG. 3 illustrates a processing of a conversational dialogue between a user and a digital human using sentiment-based adaptation of digital human responses in accordance with an illustrative embodiment. In the example of FIG. 3, a user may interact with a digital human displayed on a webpage, for example, to provide a user input 320 (e.g., by asking the digital human a question). The user input 320, from a current user environment with a digital human 310, is applied to an orchestration system 330. The orchestration system 330 provides the user input 320 to a conversation system 350 in the form of a user request 340. The conversation system 350 processes the user request 340; manages a flow, context and session state of each conversation; understands user queries and generates appropriate responses based on information retrieval techniques and language model responses, as discussed hereinafter.

In some embodiments, the conversation system 350 comprises one or more persistent session context slots 355 (e.g., tracker slots). The stored session context information allows a digital human to remember previous interactions and other data associated with specific sessions.

The conversation system 350 receives the user request 340 and provides the user request 340, in the form of a user query 360, to a retrieval-augmented generation (RAG)-based information retrieval system 365 to benefit the conversational flow. The RAG-based information retrieval system 365 receives the user query 360 as an input and performs one or more information retrieval searches. The response from the RAG-based information retrieval system 365 may be in the form of ranked results in some embodiments, and the top N results (e.g., the highest-ranking result) may be applied to a language model 375 as one or more context-based prompts 370 (e.g., based at least in part on a prompt size limit).

As noted above, the RAG-based information retrieval system 365 may be implemented, at least in part, in some embodiments, using the Pryon answer engine, commercially available from Pryon Inc. and/or the information retrieval functionality of the Milvus open-source vector database system.

The RAG-based information retrieval system 365 generates one or more context-based prompts 370 based on context-specific knowledge obtained using the user query 360. RAG is a technique for enhancing the accuracy and/or reliability of generative artificial intelligence models, such as the language model 375, with information obtained from external sources. The context-based prompts 370 ground the language model 375 in some embodiments using one or more external sources of knowledge that supplement the internal representation of information by the language model 375.

The one or more context-based prompts 370 are applied to the language model 375 that generates a digital human response 380 (e.g., relevant information and responses based on a conversational dialogue and/or the user's region of interest). The language model 375 may combine the retrieved words in the one or more context-based prompts 370 with its own response to the user request 340 into a digital human response 380. The digital human response 380 may be communicated to the user, for example, using the digital human creation/adaptation module 118, as discussed herein.

The digital human response 380 may comprise relevant information and responses based on a conversational dialogue and/or what the user was looking at. The conversation system 350 may provide a digital human response 382 to a sentiment-based digital human response modification module 385, as discussed further below in conjunction with FIG. 4. Generally, the sentiment-based digital human response modification module 385 may determine a sentiment of the user and adapt the digital human response 382 based on the determined sentiment, to generate a sentiment-tagged digital human response 387. In one or more embodiments, the sentiment-based digital human response modification module 385 may be implemented using a language model, such as a language model trained to perform sentiment insertion, as discussed further below in conjunction with FIG. 4. In various embodiments, the language model of the sentiment-based digital human response modification module 385 may be integrated with the language model 375 as a single language model, or implemented as a distinct language model, as shown in the example of FIG. 3.

The conversation system 350 provides the sentiment-tagged digital human response 387 to the orchestration system 330 in the form of a sentiment-tagged digital human response 390. Likewise, the orchestration system 330 may provide the sentiment-tagged digital human response 390 to the current user environment with a digital human 310 in the form of a sentiment-tagged digital human response 395, for presentation to the user, for example, by a digital human. In addition, the orchestration system 330 may navigate the user to a destination address, associated with the sentiment-tagged digital human response 395, identifying a destination having additional information.

The conversation system 350 may receive the results from the RAG-based information retrieval system 365 in some embodiments, generate the context-based prompts 370, make a call to the language model 375 to obtain the digital human response 380 and store at least a portion of the digital human response 380 in one or more of the persistent session context slots 355, before providing the digital human response 380 to the sentiment-based digital human response modification module 385.

In one or more embodiments, the orchestration system 330 may be implemented, for example, using one or more Python scripts, or a Python application, to route signals from the components interconnected with the orchestration system 330 via one or more application programming interfaces (APIs), such as RESTful APIs generated using the fastAPI web framework. In at least some embodiments, the conversation system 350 may be implemented, at least in part, using Rasa conversational artificial intelligence software, commercially available from Rasa Technologies Inc.

Figure 4:
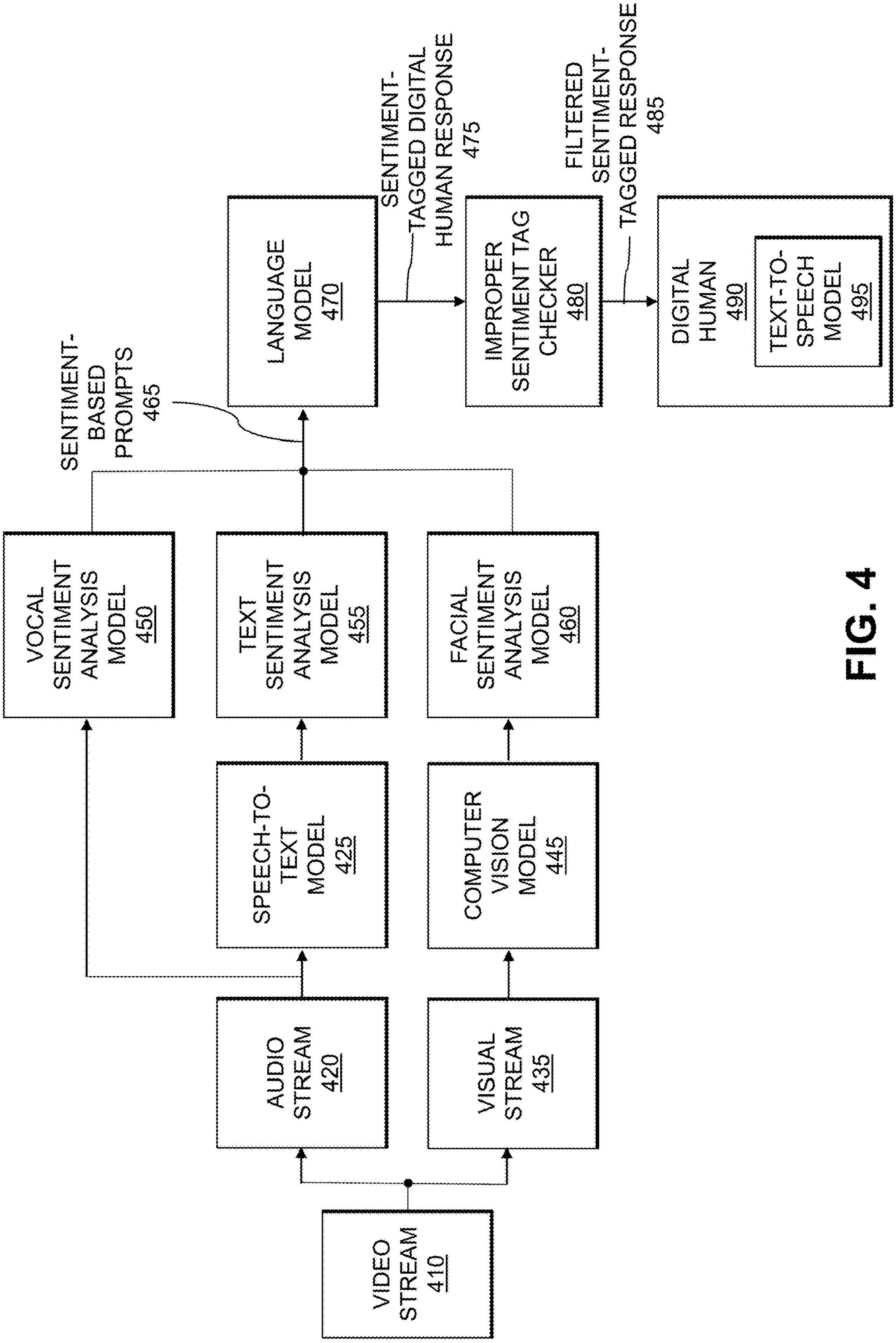
FIG. 4 illustrates an exemplary processing of a video stream associated with a user to determine a sentiment of the user and a sentiment-based digital human response in accordance with an illustrative embodiment.

FIG. 4 illustrates an exemplary processing of a video stream 410 associated with a user to determine a sentiment of the user and a sentiment-based digital human response in accordance with an illustrative embodiment. The processing of FIG. 4 may be performed in some embodiments by the sentiment-based digital human response modification module 385 of FIG. 3. In the example of FIG. 4, a received video stream 410 (e.g., as part of sensing data 104 from an environment where a digital human is interacting with a user) is separated into an audio stream 420 and a visual stream 435. One or more digital signal processing operations may be performed using at least one processing device on at least portions of the audio stream 420 and/or visual stream 435 to determine a vocal sentiment, a text sentiment and/or a facial sentiment of a given user from speech signals and/or images associated with the user. The one or more digital signal processing operations may, for example, filter, enhance, convert and/or transform the audio stream 420 and/or visual stream 435 for analysis and detection of the user sentiment (e.g., the vocal sentiment, the text sentiment and/or the facial sentiment).

In one or more embodiments, the audio stream 420 is applied to a speech-to-text model 425 that generates text that is applied to a text sentiment analysis model 455. The text sentiment analysis model 455 determines a text-based sentiment of at least one user. One or more embodiments of the disclosure include utilizing TensorFlow, which provides a speech command dataset that can include, for example, one-second utterances of multiple words spoken by multiple people. Such a dataset can be used as training data for the speech-to-text model 425, and one or more designated libraries can be used for audio processing in Python, for example. Additionally, at least one embodiment includes using at least one neural network for feature learning and predicting conversions of audio data to text data. The speech-to-text model 425 in such an embodiment can use, for example, a one-dimension convolutional neural network, such as a Conv1d layer.

In one or more embodiments, the text sentiment analysis model 455 may be implemented using the techniques described in, for example, Stanford CoreNLP (Stanford NLP, Github, 2020), incorporated by reference herein in its entirety.

In addition, the audio stream 420 is applied to a vocal sentiment analysis model 450. The vocal sentiment analysis model 450 determines a vocal-based sentiment of the at least one user. In some embodiments, the vocal sentiment analysis model 450 may be implemented using the techniques described in, for example, Bagus Tris Atmaja and Akira Sasou, "Sentiment Analysis and Emotion Recognition from Speech Using Universal Speech Representations," National Institute of Advanced Industrial Science and Technology, Tsukuba 305-8560, Japan, Sensors 2022, Aug. 24, 2022, incorporated by reference herein in its entirety.

In at least one embodiment, the visual stream 435 is applied to a computer vision model 445. The computer vision model 445 in some embodiments may comprise a pre-trained computer vision model (e.g., pre-trained using reference and/or authenticated component images) such as, for example, a model based on at least one convolutional neural network. The computer vision model 445 may pre-process one or more images in the visual stream 435 for further processing by a facial sentiment analysis model 460 that determines a facial-based sentiment of the at least one user, for example, using a convolutional neural network (CNN) model, such as a region-based CNN (R-CNN) model to perform facial-based sentiment prediction. In an embodiment, the facial sentiment analysis model 460 may be implemented using the techniques described in, for example, Saining Zhang et al., "A Dual-Direction Attention Mixed Feature Network for Facial Expression Recognitions," Electronics 2023, Aug. 25, 2023, incorporated by reference herein in its entirety.

The computer vision model 445 may perform object detection and/or isolate objects of interest (such as faces, lips or other body parts) using bounding boxes and/or other cropping techniques to create rectangular image snippets, for example. The computer vision model 445 may be implemented using the techniques described in, for example, Abhinav Veeramalla, "Face Detection and Cropping using OpenCV in Python," (Medium, Jul. 12, 2023), incorporated by reference herein in its entirety. In some embodiments, the computer vision model 445 may perform a loop for each detected face (or other body parts of interest), extract the face from the image, standardize a size of the extracted portion (e.g., a cropped face or other body part) and provide the coordinates of the cropped body part (such as 200×200 rectangular pixels).

The vocal-based sentiment, the text-based sentiment and the facial-based sentiment of at least one user, generated by the models 450, 455 and 460, respectively, are applied as at least a part of one or more sentiment-based prompts 465 (e.g., system prompts) to a language model 470. The system prompt may specify that the language model is a sentiment decision maker that receives one or more sentiment signals from other machine learning models (e.g., models 450, 455 and 460) and that the language model needs to standardize the output to a list of designated digital human sentiment reactions (e.g., happy, sad, excited and/or angry). For example, a representative sentiment-based prompt 465 may indicate that the facial sentiment has a value of "neutral," the voice sentiment has a value of "annoyed," and the text sentiment has a value of "negative" (e.g., the speech of the user seems annoyed but the facial expression of the user does not show the annoyance). The language model may conclude, based on the sentiment inputs, that the overall sentiment is angry, and respond back in an empathetic manner. The digital human adaptation system 110 may have a rule, however, indicating that a digital human should not act in an angry manner to customers.

The language model 470 processes the sentiment-based prompts 465 to generate a sentiment-tagged digital human response 475 (e.g., relevant information and responses based on a conversational dialogue and/or the user's region of interest). The sentiment-tagged digital human response 475 influences the sentiment or emotion of the digital human at any given point in the delivery of the response. For example, one portion of a digital human response may be tagged for delivery with a joyful sentiment, while another portion of the same digital human response may be tagged for delivery with a sad sentiment.

As shown in FIG. 4, the sentiment-tagged digital human response 475 may be applied to an improper sentiment tag checker 480 that evaluates the one or more sentiment tags to ensure that improper (or otherwise not permitted) sentiment tags are not applied to a digital human. For example, as noted above, the digital human adaptation system 110 may have a rule indicating that a digital human should not act in an angry manner to customers, which may be enforced in some embodiments by the improper sentiment tag checker 480. Thus, angry sentiment tags may be blocked in such a scenario. The improper sentiment tag checker 480 may be implemented, for example, as a language model or another intelligent system. The improper sentiment tag checker 480 filters the sentiment-tagged digital human response 475, to remove improper sentiment tags, and provides a filtered sentiment-tagged response 485 with any remaining sentiment tags.

The filtered sentiment-tagged response 485 is applied to a digital human 490 using a text-to-speech model 495 for delivery to a user. The digital human 490 will present the filtered sentiment-tagged response 485, or portions thereof, using one or more sentiments identified with sentiment tags. In various embodiments, the following representative sentiment types may be employed: anger, anticipation, disgust, fear, joy, sadness, surprise and trust. In addition, in some embodiments, each sentiment type may be delivered using a strength of a weak sentiment, a normal sentiment or a strong sentiment. A given sentiment and/or the corresponding sentiment strength may be conveyed to the digital human in a processor-readable format, such as Speech Synthesis Markup Language (SSML) tags, which may cause a digital human that receives the sentiment tag to alter a voice and/or a facial expression in a designated manner to convey the indicated sentiment.

FIG. 5 is a process diagram illustrating an exemplary process 500 for sentiment-based adaptation of digital human responses in accordance with an illustrative embodiment. In the example of FIG. 5, the exemplary process 500 initially evaluates a user sentiment in step 1 based on a vocal analysis, a textual analysis and/or a facial analysis (for example, performed by one or more of the models 450, 455 and 460 of FIG. 4). The determined user sentiment is applied in step 2 as one or more prompts to a language model (e.g., language model 470 of FIG. 4) that determines a sentiment-tagged response for the user based at least in part on a user input (e.g., based on a user query and/or a determined region of interest of the user) and/or the determined user sentiment. The sentiment tags of the sentiment-tagged response for the user may be filtered in step 3, for example, based at least in part on a designated stop list of improper sentiment tags.

The filtered sentiment-tagged response is provided in step 4 to a digital human for delivery to the user in a spoken format based at least in part on the determined user sentiment. In addition, a facial expression and/or a body positioning of the digital human may also be adjusted in step 5 based at least in part on the determined user sentiment. Steps 1 through 5 may be repeated in some embodiments for one or more additional iterations (e.g., in response to detecting a new user sentiment) to adapt a digital human to changes in the user sentiment.

Figure 6:
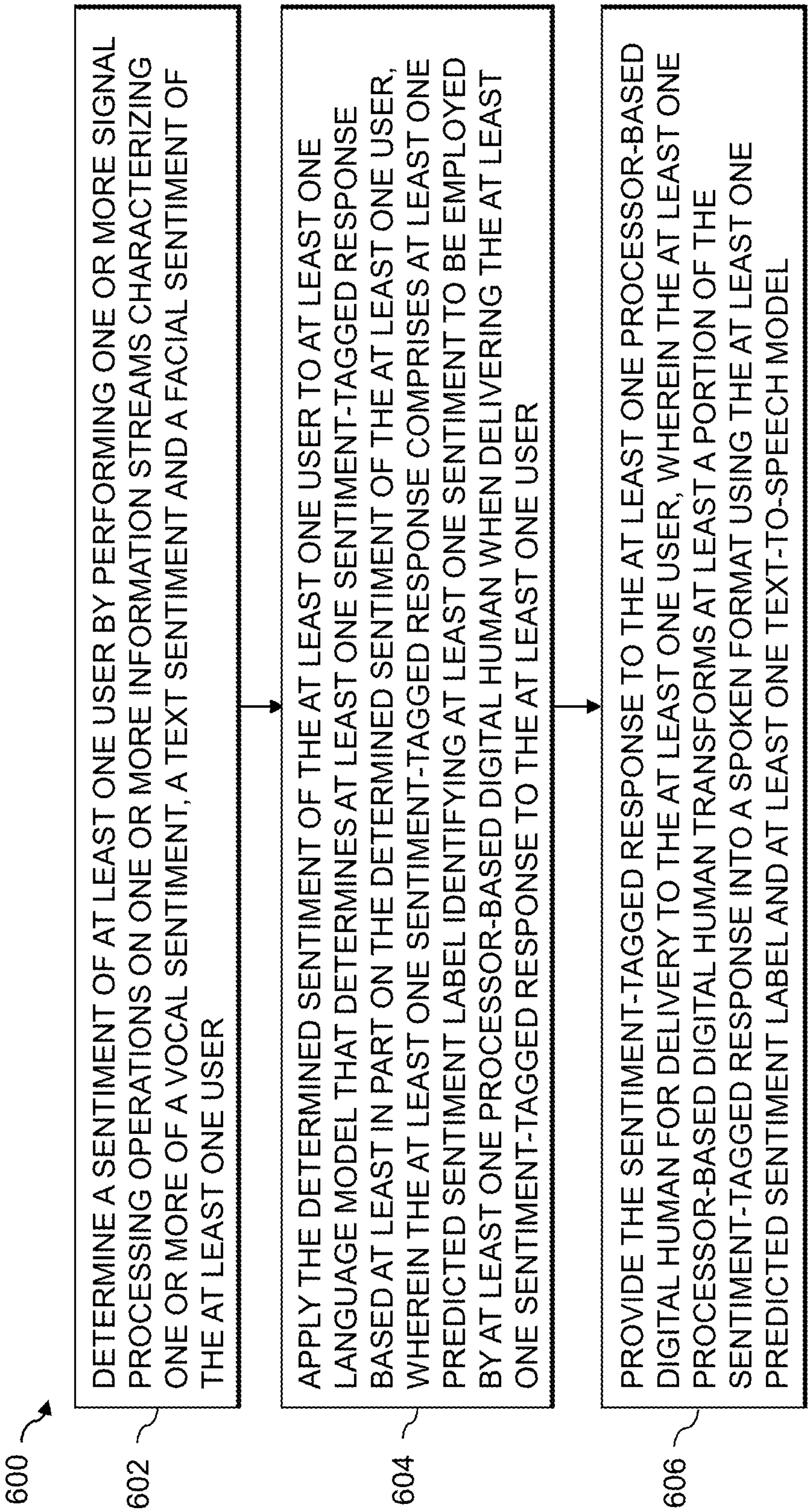
FIG. 6 is a flow diagram illustrating an exemplary implementation of a process for sentiment-based adaptation of digital human responses in accordance with an illustrative embodiment.

FIG. 6 is a flow diagram illustrating an exemplary implementation of a process 600 for sentiment-based adaptation of digital human responses in accordance with an illustrative embodiment. In the example of FIG. 6, a sentiment of at least one user is determined in step 602 by performing one or more signal processing operations on one or more information streams characterizing one or more of a vocal sentiment, a text sentiment and a facial sentiment of the at least one user.

The determined sentiment of the at least one user may be applied in step 604 to at least one language model that determines at least one sentiment-tagged response to an input of the at least one user based at least in part on the determined sentiment of the at least one user, wherein the at least one sentiment-tagged response comprises at least one predicted sentiment label identifying at least one sentiment to be employed by at least one processor-based digital human when delivering the at least one sentiment-tagged response to the at least one user.

The sentiment-tagged response may be provided to the at least one processor-based digital human in step 606 for delivery to the at least one user, wherein the at least one processor-based digital human transforms at least a portion of the sentiment-tagged response into a spoken format using the at least one predicted sentiment label and at least one text-to-speech model.

In at least one embodiment, at least one audio stream associated with the at least one user is processed to obtain the speech sentiment and/or the text sentiment of the at least one user and at least one video stream associated with the at least one user is processed to obtain the facial sentiment of the at least one user.

In some embodiments, one or more designated improper sentiment tags may be removed from the sentiment-tagged response for the at least one user, prior to the providing the sentiment-tagged response to the at least one processor-based digital human. A vocal tone, a facial expression and/or a body positioning of the at least one processor-based digital human may be adjusted based at least in part on the determined sentiment of the at least one user.

In one or more embodiments, the sentiment-tagged response for the at least one user is based at least in part on at least one user input from the at least one user. A mapping of a given sentiment to a corresponding designated manner may be obtained for delivering a response by the at least one processor-based digital human. For example, different digital human facial expressions and/or different digital human body postures may be employed for delivering digital human responses with a joyful sentiment as opposed to a sad sentiment.

The particular processing operations and other network functionality described in conjunction with FIGS. 3 through 6, for example, are presented by way of illustrative example only, and should not be construed as limiting the scope of the disclosure in any way. Alternative embodiments can use other types of processing operations for sentiment-based adaptation of digital human responses. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

One or more embodiments of the disclosure provide improved methods, apparatus and computer program products for sentiment-based adaptation of digital human responses. The foregoing applications and associated embodiments should be considered as illustrative only, and numerous other embodiments can be configured using the techniques disclosed herein, in a wide variety of different applications.

It should also be understood that the disclosed techniques for sentiment-based adaptation of digital human responses, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for sentiment-based adaptation of digital human responses may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based digital human adaptation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based digital human adaptation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
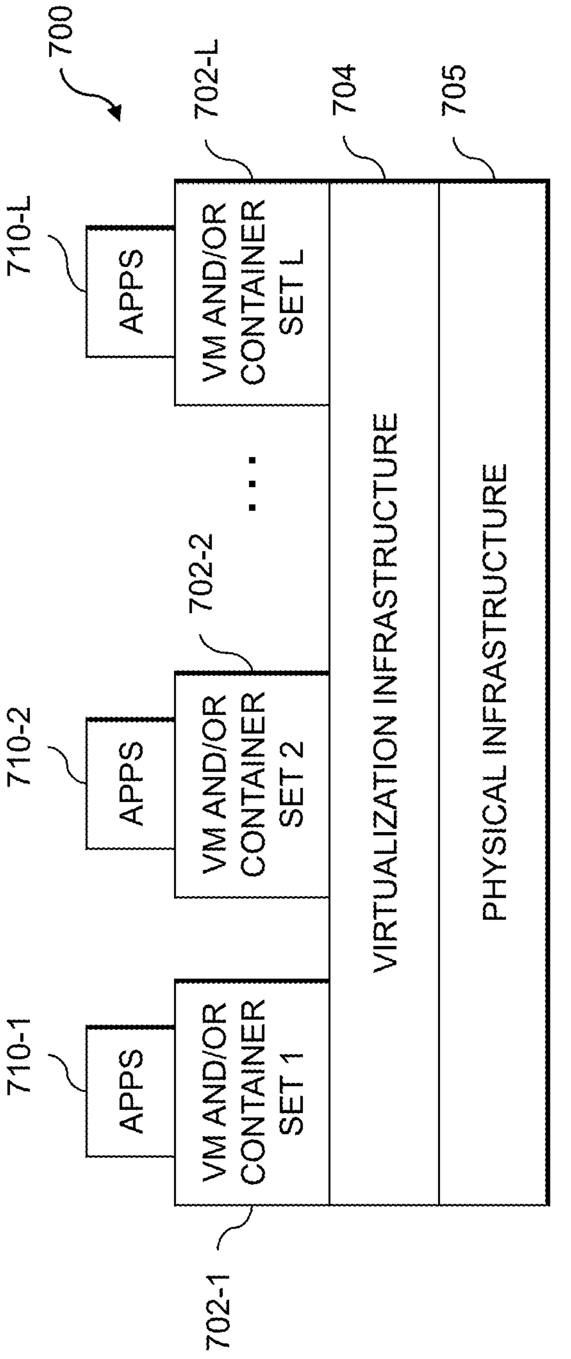
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide digital human adaptation functionality of the type described above for one or more processes running on a given one of the VMs. For example, each of the VMs can implement digital human adaptation control logic and associated functionality for monitoring users interacting with a digital human and adapting digital human responses based on a determined user sentiment, for one or more processes running on that particular VM.

An example of a hypervisor platform that may be used to implement a hypervisor within the virtualization infrastructure 704 is a compute virtualization platform which may have an associated virtual infrastructure management system such as server management software. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide digital human adaptation functionality of the type described above for one or more processes running on different ones of the containers. For example, a container host device supporting multiple containers of one or more container sets can implement one or more instances of digital human adaptation control logic and associated functionality for monitoring users interacting with a digital human and adapting digital human responses based on a determined user sentiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
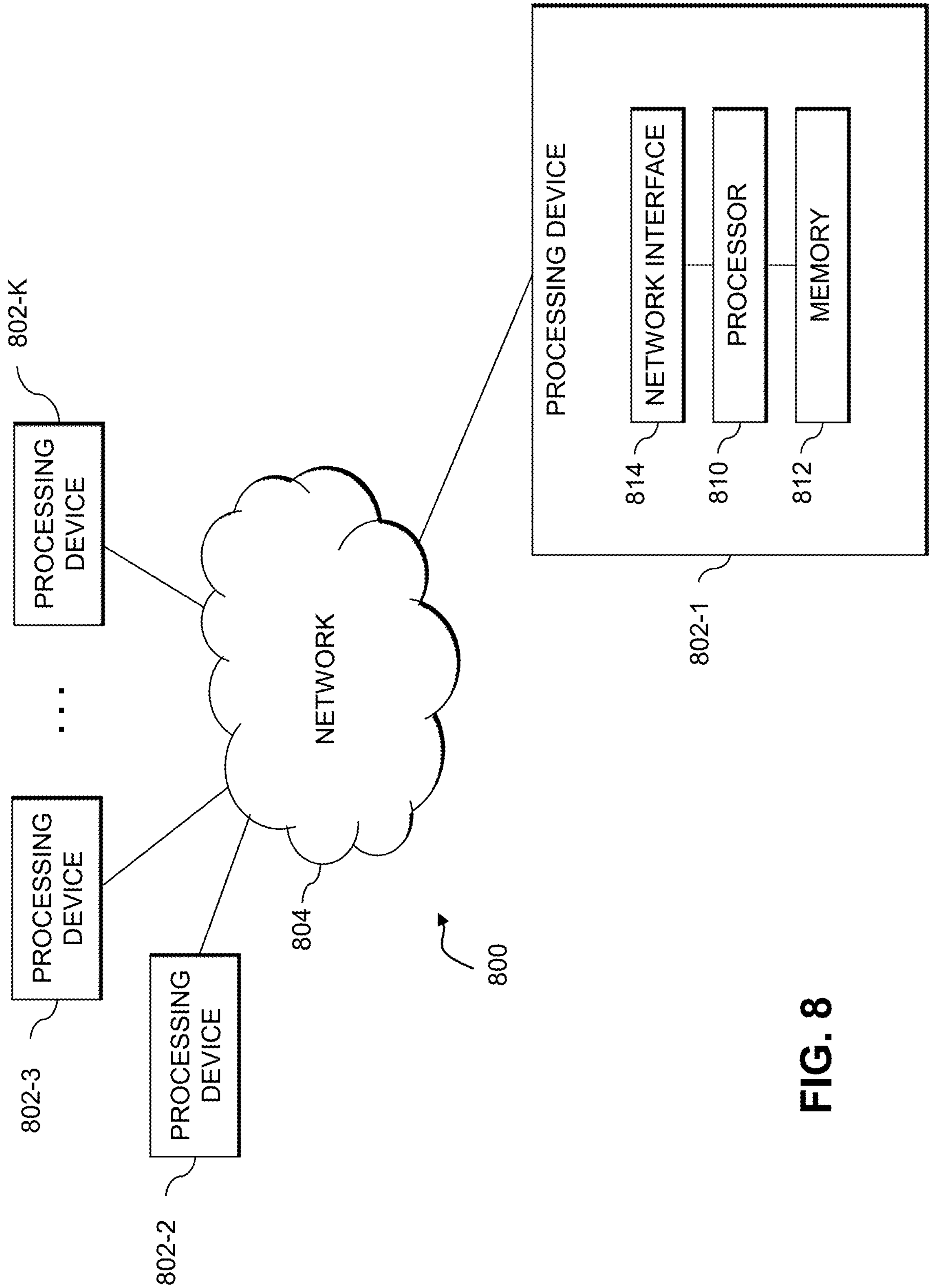
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

determining, using at least one processing device, a sentiment of at least one user, wherein the sentiment of the at least one user comprises two or more of (i) a vocal sentiment, determined using at least one vocal sentiment analysis model that analyzes at least one audio stream associated with the at least one user, (ii) a text sentiment, determined using at least one text sentiment analysis model that analyzes at least one text stream, derived from the at least one audio stream, associated with the at least one user, and (iii) a facial sentiment, determined using at least one facial sentiment analysis model that analyzes one or more objects derived from one or more images of at least one visual stream associated with the at least one user;

applying the determined sentiment of the at least one user, as one or more sentiment-based prompts, to at least one artificial intelligence (AI)-based language model that determines at least one sentiment-tagged response to an input of the at least one user based at least in part on the determined sentiment of the at least one user, wherein the at least one sentiment-tagged response comprises at least one predicted sentiment label identifying at least one sentiment to be employed by at least one AI-based digital human when delivering the at least one sentiment-tagged response to the at least one user, wherein the at least one AI-based language model is trained to perform sentiment insertion into the at least one sentiment-tagged response; and providing the sentiment-tagged response to the at least one AI-based digital human for delivery to the at least one user, wherein the at least one AI-based digital human transforms at least a portion of the sentiment-tagged response into a spoken format using the at least one predicted sentiment label and at least one text-to-speech model;

wherein the method is performed by at least one processing device comprising a processor coupled to a memory.

2. The method of claim 1, wherein the at least one audio stream associated with the at least one user is processed to obtain one or more of the vocal sentiment and the text sentiment of the at least one user.

3. The method of claim 1, wherein the at least one visual stream associated with the at least one user is processed to obtain the facial sentiment of the at least one user.

4. The method of claim 1, wherein the two or more of the vocal sentiment, the text sentiment and the facial sentiment of the at least one user are provided to the at least one AI-based language model as at least one system prompt.

5. The method of claim 1, further comprising removing one or more designated improper sentiment tags from the sentiment-tagged response for the at least one user, prior to the providing the sentiment-tagged response to the at least one AI-based digital human.

6. The method of claim 1, further comprising adjusting one or more of a vocal tone, a facial expression and a body positioning of the at least one AI-based digital human based at least in part on the determined sentiment of the at least one user.

7. The method of claim 1, wherein the sentiment-tagged response for the at least one user is based at least in part on at least one user input from the at least one user.

8. The method of claim 1, further comprising obtaining a mapping of a given sentiment to a corresponding designated manner for delivering a response by the at least one AI-based digital human.

9. An apparatus comprising:

at least one processing device comprising a processor coupled to a memory;

the at least one processing device being configured to implement the following steps:

determining, using at least one processing device, a sentiment of at least one user, wherein the sentiment of the at least one user comprises two or more of (i) a vocal sentiment, determined using at least one vocal sentiment analysis model that analyzes at least one audio stream associated with the at least one user, (ii) a text sentiment, determined using at least one text sentiment analysis model that analyzes at least one text stream, derived from the at least one audio stream, associated with the at least one user, and (iii) a facial sentiment, determined using at least one facial sentiment analysis model that analyzes one or more objects derived from one or more images of at least one video visual stream associated with the at least one user;

applying the determined sentiment of the at least one user, as one or more sentiment-based prompts, to at least one artificial intelligence (AI)-based language model that determines at least one sentiment-tagged response to an input of the at least one user based at least in part on the determined sentiment of the at least one user, wherein the at least one sentiment-tagged response comprises at least one predicted sentiment label identifying at least one sentiment to be employed by at least one AI-based digital human when delivering the at least one sentiment-tagged response to the at least one user, wherein the at least one AI-based language model is trained to perform sentiment insertion into the at least one sentiment-tagged response; and providing the sentiment-tagged response to the at least one AI-based digital human for delivery to the at least one user, wherein the at least one AI-based digital human transforms at least a portion of the sentiment-tagged response into a spoken format using the at least one predicted sentiment label and at least one text-to-speech model.

10. The apparatus of claim 9, wherein the at least one audio stream associated with the at least one user is processed to obtain one or more of the vocal sentiment and the text sentiment of the at least one user and at least one visual stream associated with the at least one user is processed to obtain the facial sentiment of the at least one user.

11. The apparatus of claim 9, wherein the two or more of the vocal sentiment, the text sentiment and the facial sentiment of the at least one user are provided to the at least one AI-based language model as at least one system prompt.

12. The apparatus of claim 9, further comprising removing one or more designated improper sentiment tags from the sentiment-tagged response for the at least one user, prior to the providing the sentiment-tagged response to the at least one AI-based digital human.

13. The apparatus of claim 9, further comprising adjusting one or more of a vocal tone, a facial expression and a body positioning of the at least one AI-based digital human based at least in part on the determined sentiment of the at least one user.

14. The apparatus of claim 9, further comprising obtaining a mapping of a given sentiment to a corresponding designated manner for delivering a response by the at least one AI-based digital human.

15. A non-transitory processor-readable storage medium having stored therein program code of one or more software programs, wherein the program code when executed by at least one processing device causes the at least one processing device to perform the following steps:

determining, using at least one processing device, a sentiment of at least one user, wherein the sentiment of the at least one user comprises two or more of (i) a vocal sentiment, determined using at least one vocal sentiment analysis model that analyzes at least one audio stream associated with the at least one user, (ii) a text sentiment, determined using at least one text sentiment analysis model that analyzes at least one text stream, derived from the at least one audio stream, associated with the at least one user, and (iii) a facial sentiment, determined using at least one facial sentiment analysis model that analyzes one or more objects derived from one or more images of at least one visual stream associated with the at least one user;

applying the determined sentiment of the at least one user, as one or more sentiment-based prompts, to at least one artificial intelligence (AI)-based language model that determines at least one sentiment-tagged response to an input of the at least one user based at least in part on the determined sentiment of the at least one user, wherein the at least one sentiment-tagged response comprises at least one predicted sentiment label identifying at least one sentiment to be employed by at least one AI-based digital human when delivering the at least one sentiment-tagged response to the at least one user, wherein the at least one AI-based language model is trained to perform sentiment insertion into the at least one sentiment-tagged response; and providing the sentiment-tagged response to the at least one AI-based digital human for delivery to the at least one user, wherein the at least one AI-based digital human transforms at least a portion of the sentiment-tagged response into a spoken format using the at least one predicted sentiment label and at least one text-to-speech model.

16. The non-transitory processor-readable storage medium of claim 15, wherein the at least one audio stream associated with the at least one user is processed to obtain one or more of the vocal sentiment and the text sentiment of the at least one user and the at least one visual stream associated with the at least one user is processed to obtain the facial sentiment of the at least one user.

17. The non-transitory processor-readable storage medium of claim 15, wherein the one or more of the vocal sentiment, the text sentiment and the facial sentiment of the at least one user are provided to the at least one AI-based language model as at least one system prompt.

18. The non-transitory processor-readable storage medium of claim 15, further comprising removing one or more designated improper sentiment tags from the sentiment-tagged response for the at least one user, prior to the providing the sentiment-tagged response to the at least one AI-based digital human.

19. The non-transitory processor-readable storage medium of claim 15, further comprising adjusting one or more of a vocal tone, a facial expression and a body positioning of the at least one AI-based digital human based at least in part on the determined sentiment of the at least one user.

20. The non-transitory processor-readable storage medium of claim 15, further comprising obtaining a mapping of a given sentiment to a corresponding designated manner for delivering a response by the at least one AI-based digital human.

* * * * *